United States Patent
Gong et al.

(10) Patent No.: US 11,899,754 B2
(45) Date of Patent: Feb. 13, 2024

(54) ROI-BASED DATA CONTENT GRAPH FOR WIDE DATA MANAGEMENT

(71) Applicant: Dell Products L.P., Round Rock, TX (US)

(72) Inventors: Min Gong, Shanghai (CN); Qi Bao, Acton, MA (US); Qicheng Qiu, Shanghai (CN); Chunxi Chen, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 95 days.

(21) Appl. No.: 17/719,724

(22) Filed: Apr. 13, 2022

(65) Prior Publication Data

US 2023/0334122 A1    Oct. 19, 2023

(51) Int. Cl.
| | |
|---|---|
| *G06F 16/25* | (2019.01) |
| *G06F 16/901* | (2019.01) |
| *G06F 18/23213* | (2023.01) |
| *G06N 5/025* | (2023.01) |

(52) U.S. Cl.
CPC ........ *G06F 18/23213* (2023.01); *G06F 16/25* (2019.01); *G06F 16/9024* (2019.01); *G06N 5/025* (2013.01)

(58) Field of Classification Search
CPC ............... G06F 18/23213; G06F 16/25; G06F 16/9024; G06N 5/025
See application file for complete search history.

(56) References Cited

U.S. PATENT DOCUMENTS

| | | | |
|---|---|---|---|
| 10,789,296 B2 * | 9/2020 | Trim | G06F 18/2193 |
| 11,544,491 B2 * | 1/2023 | Pouyan | G06N 20/00 |
| 11,574,488 B2 * | 2/2023 | Gesley | G06F 18/24143 |
| 11,763,235 B1 * | 9/2023 | Penfield | G06F 40/205 |
| | | | 704/9 |
| 2016/0267397 A1 * | 9/2016 | Carlsson | G06F 11/3048 |
| 2020/0394455 A1 * | 12/2020 | Lee | G06Q 40/08 |
| 2021/0133670 A1 * | 5/2021 | Cella | G06N 3/044 |
| 2021/0286989 A1 * | 9/2021 | Zhong | G06F 40/177 |
| 2021/0390423 A1 * | 12/2021 | Latapie | H04L 41/0631 |
| 2022/0350805 A1 * | 11/2022 | Ma | G06N 3/08 |
| 2022/0350828 A1 * | 11/2022 | Ma | G06F 16/3347 |

* cited by examiner

*Primary Examiner* — Jorge A Casanova
(74) *Attorney, Agent, or Firm* — WOMBLE BOND DICKINSON (US) LLP

(57) ABSTRACT

This disclosure provides systems, methods, and media for creating a data graph database from various unstructured and unstructured data items for use by various services. The method comprises the operations of identifying unstructured data items in data subjects; recognizing regions of interest (ROIs) in the unstructured data items; and extracting the ROIs from the unstructured data items. The method further comprises encoding the extracted ROIs into ROI vectors; creating a data graph to represent the data subjects, the data items, and the ROI vectors; and storing the data graph into a graph database. The various embodiments can manage data items of different data formats together rather than separately, thus creating a data management system for managing data across data formats. The data management system can also store structured data items into the graph database, thus complementing the existing ETL procedure for structured data items.

20 Claims, 5 Drawing Sheets

ROI-BASED DATA CONTENT GRAPH FOR WIDE DATA MANAGEMENT

FIELD OF THE INVENTION

Embodiments of the present invention relate generally to data management systems. More particularly, embodiments of the invention relate to a data management system for managing unstructured data.

BACKGROUND

Data can generally include structure data and unstructured data. Structured data comprises data types with patterns that make them easily searchable, for example, Excel and phone records; while unstructured data types are everything else, for example, audio, video, and social media postings.

For structured data, various database management systems exist to extract, transfer, and load the data into databases, where system-level metadata can be used to describe the data. Since the data is structured, the system-level metadata can use a small number of attributes to describe the data. Examples of the system-level attributes in the metadata can include size, time of creation, access control, etc. The system-level metadata for the structured data can be easily extended when necessary to satisfy the retrieval needs of users. Thus, structured data can be considered narrow data in this disclosure.

For unstructured data, however, the limited number of system-level attributes may not be sufficient to describe the data for easy retrieval. For example, when a user wants to retrieve all the images that are suitable for training a particular neural network model, the database that stores the images needs to have metadata describing the contents of the images to satisfy the retrieval needs. To sufficiently describe the contents of structured data, a large number of content-level attributes need to be stored in the database.

Therefore, it would be desirable and beneficial to have a database management system that can extract content-level attributes from unstructured data, and stores the content-level attributes together with the unstructured data in a database.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
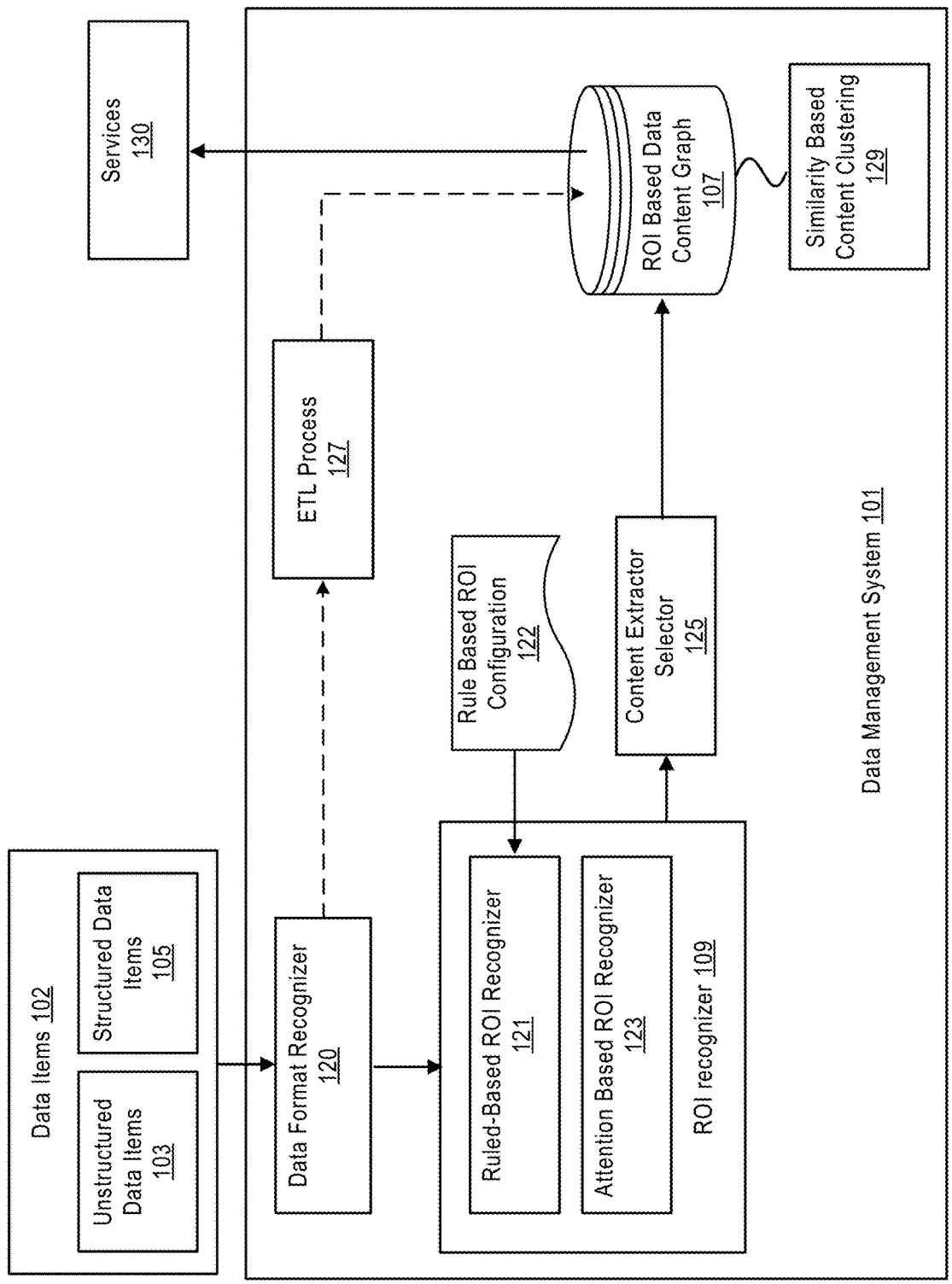
FIG. 1 illustrates a data management system for managing unstructured data in an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to various embodiments, systems, methods, and media are described for creating a data graph database from various unstructured and unstructured data items for use by various services.

In an embodiment, a method of managing data comprises the operations of identifying unstructured data items in data subjects; recognizing regions of interest (ROIs) in the unstructured data items; and extracting the ROIs from the unstructured data items. The method further comprises encoding the extracted ROIs into ROI vectors; creating a data graph to represent the data subjects, the data items, and the ROI vectors; and storing the data graph into a graph database.

The various embodiments can manage data items of different data formats together rather than separately, thus creating a data management system for managing data across data formats. Further, structured data can also be stored into the graph database to complement the existing ETL procedure for structured data items.

In an embodiment, the method further comprises grouping, by the data management system, the ROI vectors into multiple clusters according to a predetermined algorithm, which can be one of a K-means or Density-based spatial clustering of applications with noise (DBSCAN) or another clustering algorithms.

In an embodiment, the method further comprises identifying, by the data management system, one or more structured data items in the data subjects; converting, by the data management system, the one or more structured items into one or more feature vectors; and storing, by the data management system, each of the one or more feature vectors as a ROI node as part of the data graph in the graph database, or as a row in a table in the graph database. In an embodiment, the ROIs can be recognized using a ruled-based algorithm or an attention-based neural network model.

In an embodiment, the ROIs are extracted from the unstructured data items using different content extractors.

In an embodiment, a number of services can be used to retrieve the unstructured data items from the graph database. Examples of the services include a content management service, a content search service, a content insight service, and a graph analysis service.

The embodiments described above are not exhaustive of all aspects of the present invention. It is contemplated that the invention includes all embodiments that can be practiced from all suitable combinations of the various embodiments summarized above, and also those disclosed below.

The following terms are used throughout this disclosure:

Data Item: A logical data unit stored in a IT system. It can be a file, an object, or a data record in a database; and it can be structured data or unstructured data.

Data Subject: A set of data items relating to the same subject. The subject can refer to a business object or entity, and can be a logic unit in a business workflow or analysis. A data object can be wide in terms of the number of attributes, since data items in the data subject can be in different data formats and from different sources. In one implementation, a data subject can be a file folder or directory that stores data items related to a particular project or purpose.

Region of Interest (ROI): A segmentation in a data item that describes a specific content or concept. For example, an ROI in a text data item can be a topic or a viewpoint (e.g., a claim in a patent application), and an ROI in an image data item can be an object (e.g., a human face).

FIG. 1 illustrates a data management system 101 for managing unstructured data in an embodiment. The data management system 101 can extract contents from unstructured data, and create a graph describing relationships among different ROIs in different items in the same data subject or different data subjects. The unstructured data and the associated graphs can be stored in a database for use by various services.

The management system 101 include several modules, for example, a data format recognizer 120, an ROI recognizer 109, a content extractor selector 125, and an ROI based data content graph database 107.

The data format recognizer 120 can recognize the format of each data item in multiple data items 102 that are to be loaded into the graph database 107. In this figure, the data times 102 can include multiple unstructured data items (e.g., data item 103) and multiple structured data items (e.g., data item 105).

From a high level, the data format recognizer 120 can determine whether a data item is one of structure data items or unstructured data items. If a data item is a structured data item, the data format recognizer 120 can send the data item to an ETL process 127, which stores the data item into the graph database 107. If a data item is an unstructured data item, the data format recognizer 120 can send the data item to the ROI recognizer 109 for further processing.

In an embodiment, the data format recognizer 120 can determine whether a data item is an unstructured or structured based on the extension of the data item. For example, if the extension of the data item is ".xls", the data item would be a structured data item; if the extension of a data item is ".mp3", the data item would be an unstructured data item.

The ROI recognizer 109, once receiving an unstructured data item, can determine one or more ROIs on the unstructured data item. As shown in FIG. 1, the ROI recognizer 109 includes a rule based ROI recognizer 121 and an attention based ROI recognizer 123.

In an embodiment, the rule based ROI recognizer 121 can use pre-defined rules specified by a rule based ROI configuration file 122 to identify one or more ROIs in the unstructured data item. The pre-defined rules can specify which part of the data item is a ROI.

For example, if the data item is an image showing a vehicle driving on a street, then the bottom portion of the image can be a "street ROI" according to the rules.

In an embodiment, a trained machine learning model (e.g., a convolutional neural network model) can be used to implement the rules to identify ROIs in the data item. The machine learning model can be used to detect cars and pedestrians in the above image showing the vehicle driving on the street, and each detected object (i.e., car and pedestrian, etc.) can be considered an ROI.

In an embodiment, the attention based ROI recognizer 123 can use an attention mechanism to detect an ROI in an unstructured data item. The attention mechanism can be a particular type of neural network model that has been pre-trained using big data. Different attention models can be trained for different types of unstructured data, e.g., image, text, audio, and video.

For example, an attention model can be trained using labeled training data sets to learn that most people show greater interest in a human face and a Frisbee images in images showing human beings throwing Frisbees. As a result, given an image showing a little girl throwing a pink Frisbee as input, the attention model would automatically detect the face of the little girl and the pink Frisbees as ROIs.

The content extractor selector 125 can be used to select a corresponding extractor based on the data format (e.g., file type) of the unstructured data item. A pre-trained encoding extractor can be provided in the data management system 1101 for selection by the content extractor selection 125 for each type of unstructured data items. Thus, the candidate content extractors can include a text context content extractor, an image content extractor, and an audio content extractor.

The graph database 107 can be a database that uses graph structures for semantic queries with node, edges, and properties (i.e., metadata or attributes) to represent and store data. The graph structures can represent nodes and relationships among the nodes, and relate data items (nodes) to a collection of nodes and edges. The relationships allow data in the graph database 107 to be linked together directly or indirectly and retrieved with one operation.

In an embodiment, a similarity based content clustering technique 129 can be used to mine explicit content cluster nodes for faster data retrieval. In another embodiment, a vector indexing technique can be used to support fast vector comparison and retrieval.

In an embodiment, under the similarity based content clustering technique 129, ROI nodes that are sufficiently similar to each other can be clustered together. Each ROI can be represented by a vector with an array of floating numbers describing features of the ROI, and any two ROI vectors can be compared to determine their similarity represented by a similar score. If the similarity score exceeds a predetermined threshold, a "similar to" edge can be added to the two ROIs nodes in the graph database 107.

In an embodiment, the similarity of all node pairs in the graph database 107 can be calculated using the following process. First, a clustering algorithm can be used on all candidate nodes to generate a number of clusters of ROI nodes, with each node belonging to one cluster, and the clustering algorithm being one of a K-means, Density-based spatial clustering of applications with noise (DBSCAN), or another clustering algorithm. Second, in each cluster, a "similar to" edge can be added between each node pair.

Compared to a direct inter-node similarly calculation technique that uses node pairs as input to calculate cosine similarity or Euclidean similarity between node vectors, the similarity based content clustering technique 129 is more efficient overall.

When the number of ROIs are fixed, the similarity based content clustering technique 129 has a level of complexity similar to the direct inter-node similarly calculation technique. Under the K-means algorithm, the total number of similarity calculations for n ROI nodes would be $O(n^2)$, and under the DBSCAN algorithm, the number would be $O(n \log n)$.

But when a new ROI node is to be added to the graph database 107, the similarity based content clustering technique 129 only needs to process k similarity calculations, where k is the count of clusters. In comparison, an additional 1000 similarity calculations need to be performed for any new node (e.g., the $1001^{st}$ node), since the direct inter-node similarity calculation technique would require $n*(n-1)/2$ similarity calculation for each n ROI nodes. Thus, the similarity based content clustering technique 129 is more efficient in terms of the number of similarity calculations when a new ROI node is added.

Further, the outcome of the similarity based content clustering technique 129 can be used to find "semantic concepts" of each cluster. For example, if 1000 image ROI nodes are grouped into 5 clusters, and one of the clusters includes mostly dog-related ROIs, then this cluster can be associated with the semantic concept as "dog". The semantic concept would make the clusters more explainable and understandable. However, the "semantic concept" does not need to be explicit. Both the clustering technique 129 and the direct inter-node similarity calculation technique work regardless of semantic term exploration.

As further shown, multiple services 130 can use data from the graph database 107. Examples of the services 130 can include a content management service, a content search service, a content insight service, and a graph analysis service.

Figure 2:
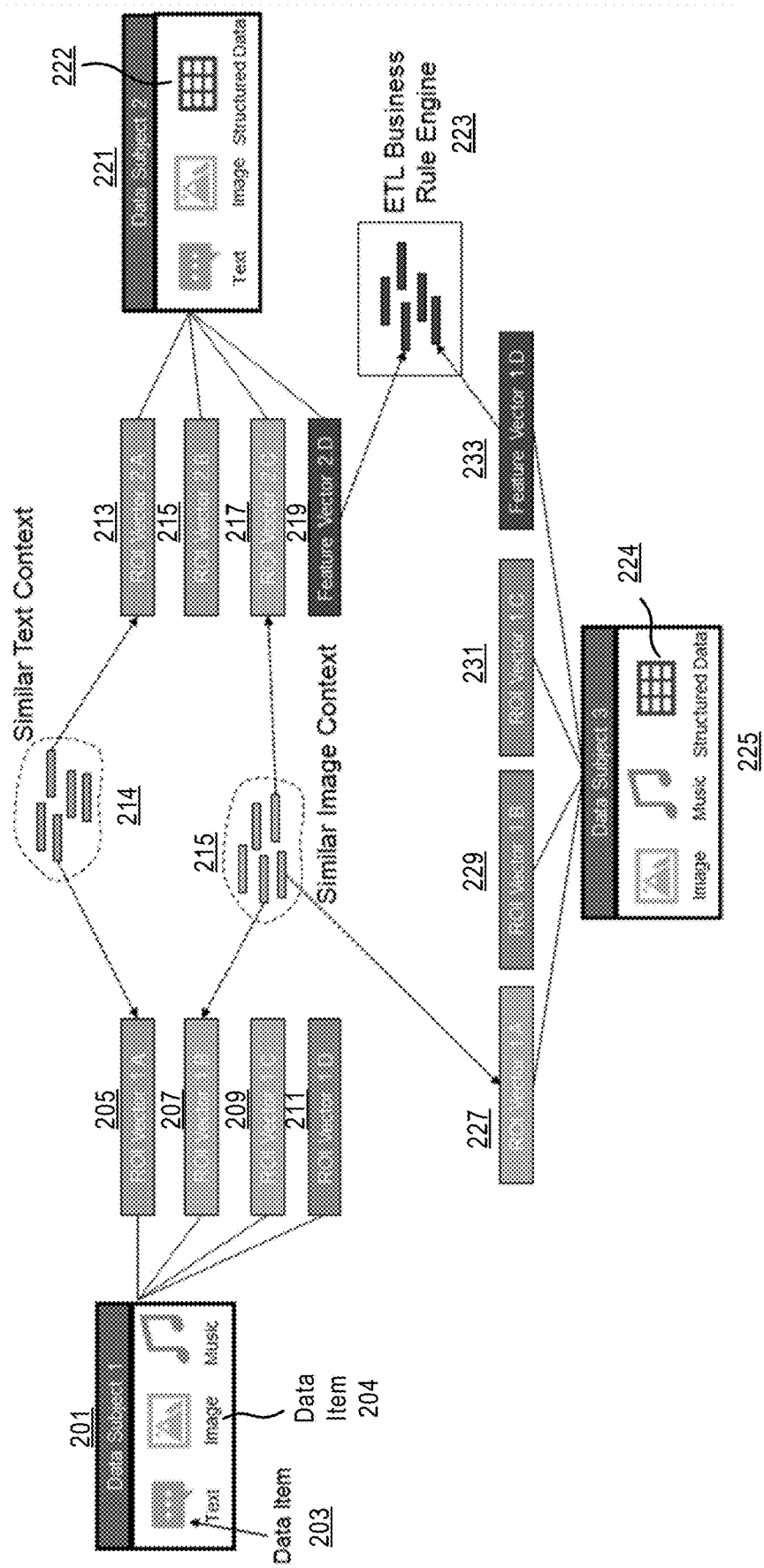
FIG. 2 illustrates a data content graph in an embodiment.

FIG. 2 illustrates a data content graph in an embodiment. The data content graph can be stored in the graph database 107 as shown in FIG. 1. This figure uses three data subjects 201, 221, and 225 to illustrate the relationships among the ROIs.

As shown in FIG. 2, each of the data subjects 201, 221, and 225 can include multiple data items of different unstructured data formats (file types), for example, text data items, image data items, and audio data items. For example, the data subject 201 includes an unstructured text data item 203, and an unstructured image data item 204. In addition, each of the data subjects 221 and 225 includes at least one structured data item, for example, data items 222 and 224.

In an embodiment, the structured data items 224 and 224 can be consumed by an existing ETL procedure, which can generate a list of field values (i.e., a feature vector). Multiple ETL procedures can generate multiple feature vectors (i.e. ROI nodes).

For example, an ETL business rule engine 223 can include multiple ETL procedures that consume the structure data items 222 and 224 to generate a feature vector 233 and a feature vector 219 respectively.

In an embodiment, each feature vector can be stored as a row in a table in the graph database 107, or stored as a ROI node because the list of field values represents features of the ROI node.

In an embodiment, each of the unstructured data items can include one or more ROIs that are extracted by the content extractors described in FIG. 1, and each ROI can be represented by an encoded ROI vector in a corresponding index space. Each encoded ROI vector can contain a list of values describing the ROI, and can be created by an encoding model corresponding to the data format of the data item.

For example, an unstructured text data item can be encoded using a natural language processing (NLP) based encoder, such as BERT-as-service; and an unstructured image data item can be encoded using a CNN based encoder, such as a pre-trained model on ImageNet.

In an embodiment, encoding models can be changed for different purposes. The more general a data format is, the more general the encoding model is.

As further shown in FIG. 2, ROI vectors 205, 207, 209, and 211 are extracted from the data subject 201; ROI vectors 213, 215, and 217 are extracted from the unstructured data items from the data subject 221; and ROI vectors 227, 229, and 231 are extracted from the unstructured data items in the data subject 225. Each ROI vector can belong to one or more concept clusters 214 and 215.

Figure 3:
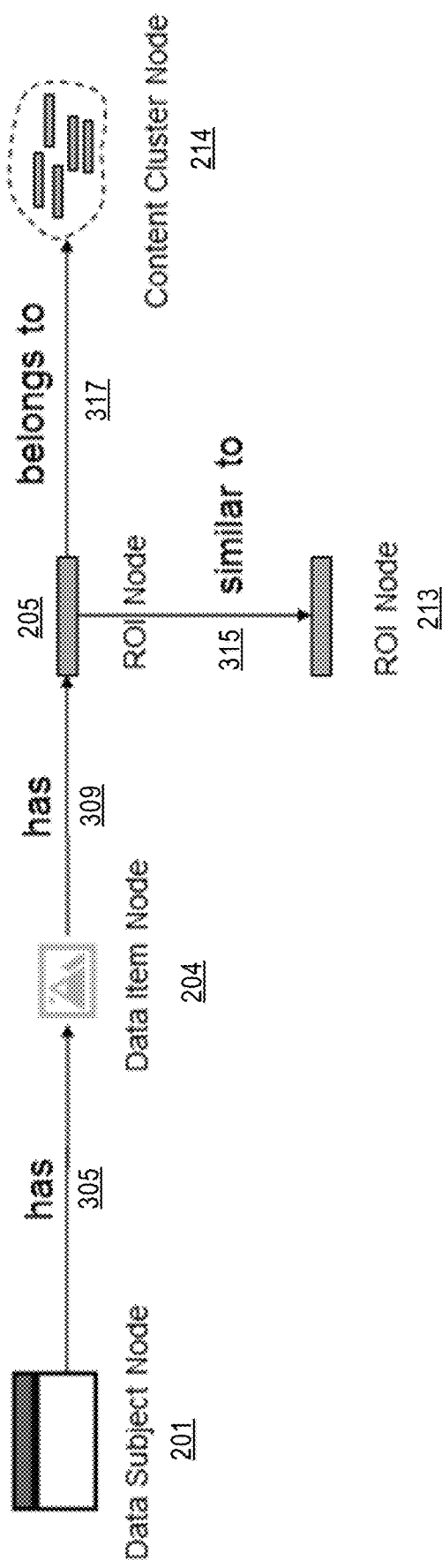
FIG. 3 illustrates an example of a graph structure in the data content graph based base shown in FIG. 2 in an embodiment.

FIG. 3 illustrates an example of a graph structure in the data content graph database 107 shown in FIG. 2 in an embodiment.

The graph database 107 can store graph structures with nodes and edges. Nodes are different data elements such as data subjects 201, 221, and 225, data items (e.g., data items 203 and 204) in the data subjects, ROI vectors (e.g., ROI vectors 205-211, 213-217, and 227-231) extracted from the data items, and concept clusters 214 and 215. Further, the feature vectors 219 and 233 can also be considered nodes. Edges are the relationships among the nodes, such as "has", "belongs to" and "similar to".

According to the example of the graph structure shown in FIG. 3, the data subject node 201 "has" the data item node 204, which further "has" the ROI node 205. The ROI node 205 "belongs to" the content cluster node (i.e. the similar text context cluster) 214. Further, the ROI node 205 is "similar to" the ROI node 213, and thus both the ROI node 205 and the ROI node 213 are grouped into the same concept cluster 214 in FIG. 2.

In one embodiment, the relationships among the nodes can be implemented using a resource description framework (RDF), a World Wide Web Consortium standard designed as a general method for description and exchange of graph data. The RDF framework is not described in detail in this disclosure.

In one embodiment, the various relationships described above can be determined by the data management system 101 before storing each node into the graph database 107. The data management system 101 can determine the inter-node relationships using the following algorithm: If an ROI node is extracted from a data item, the ROI "belongs to" the data item, which "has" the ROI node. Similarly, if a data item node is part of a data subject node, the data item node "belongs to" to the data subject, which "has" the data item node. In one implementation, a data subject node can be a folder or directory that contains all files and/or objects for a particular purpose. In such an implementation, each file or object in the folder "belongs to" the data subject.

The "similar to" relationship between two ROI nodes can be determined by the data management system 101 by comparing the two ROI vectors describing the two ROI nodes. Since each ROI vector includes a list of field values in the formats of floating numbers, the two ROI vectors can be mathematically compared to get a similarity score that measures how similar the two ROIs are to each other at the pixel level.

Figure 4:
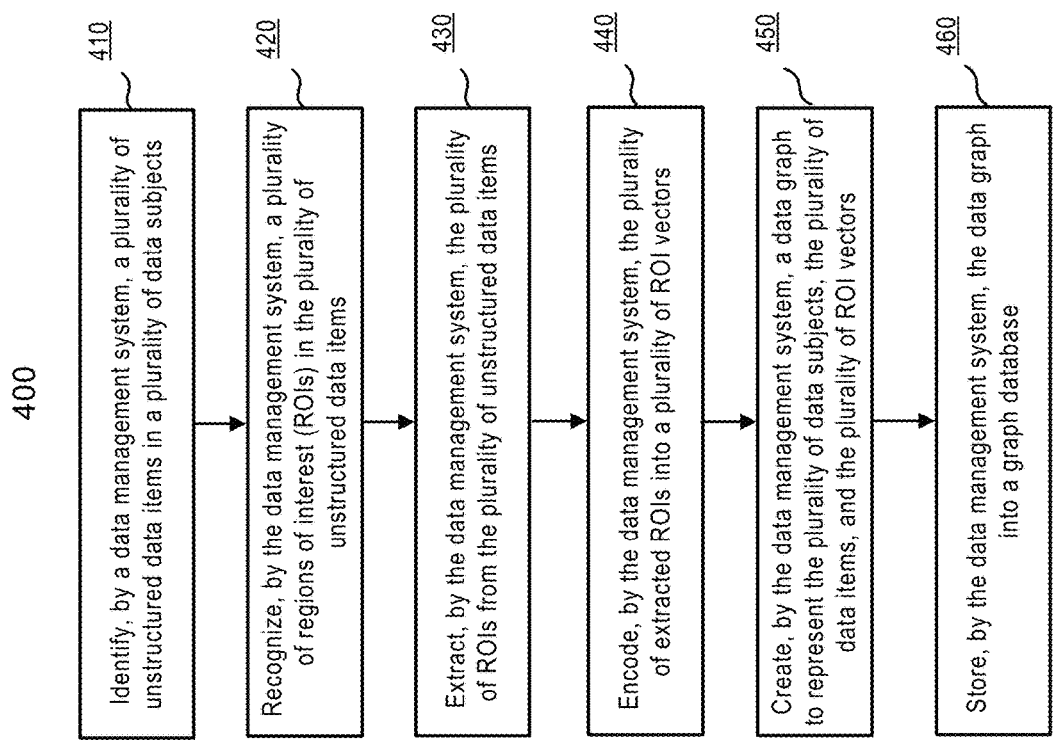
FIG. 4 illustrates a process of managing unstructured data in an embodiment.

FIG. 4 illustrates a process 400 of managing unstructured data in an embodiment. Process 400 can be performed by a processing logic which may include software, hardware, or a combination thereof. For example, process 400 may be performed by the various modules in the data management system 101 described in FIG. 1.

In operation 410, the processing logic identifies a plurality of unstructured data items in a plurality of data subjects. In operation 420, the processing logic recognizes a plurality of regions of interest (ROIs) in the plurality of unstructured data items. In operation 430, the processing logic extracts the plurality of ROIs from the plurality of unstructured data items. In operation 440, the processing logic encodes the plurality of extracted ROIs into a plurality of ROI vectors. In operation 450, the processing logic creates a data graph to represent the plurality of data subjects, the plurality of data items, and the plurality of ROI vectors. In operation 460, the processing logic stores the data graph into a graph database.

Figure 5:
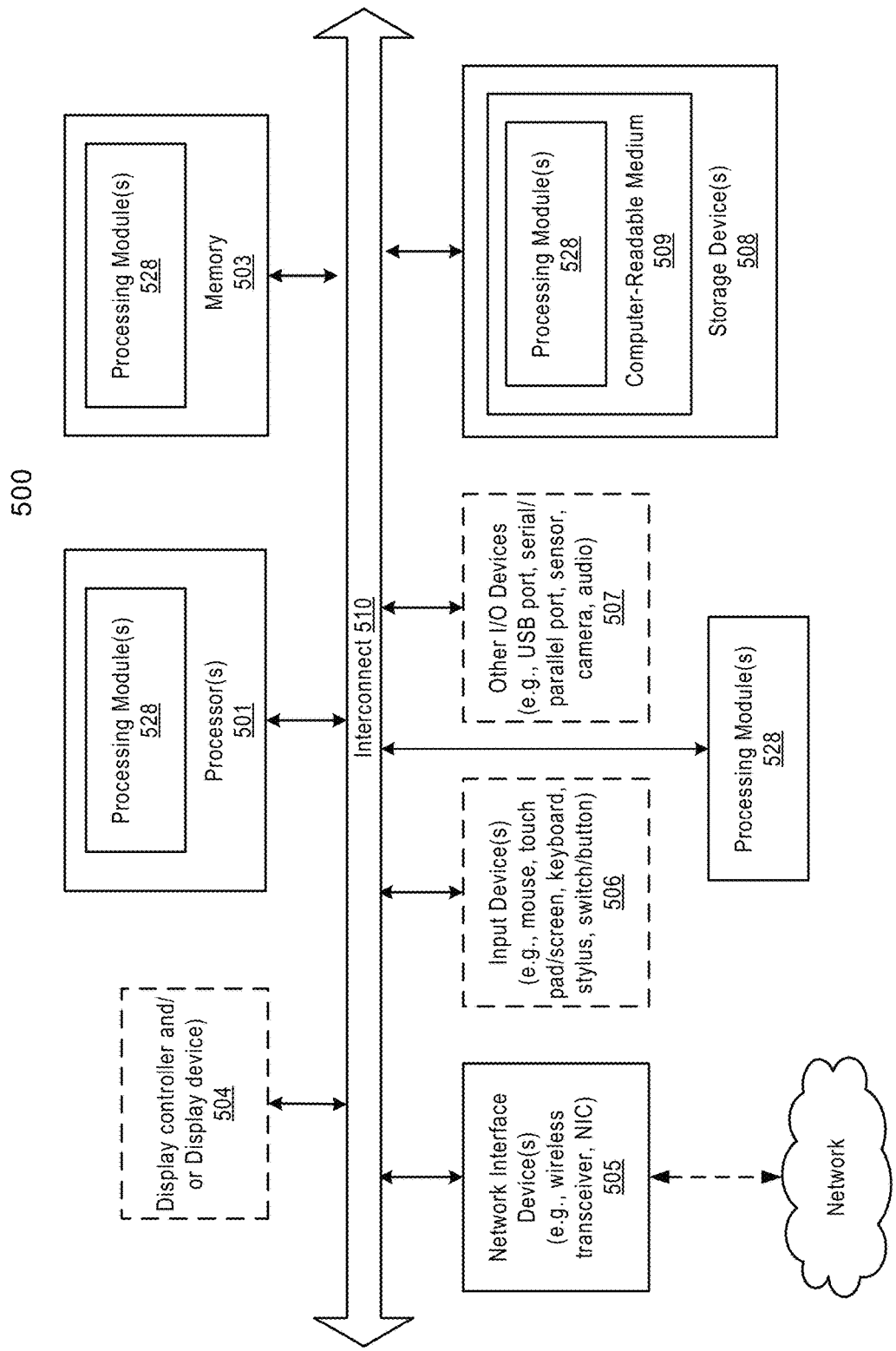
FIG. 5 is a block diagram illustrating an example of a data processing system which may be used with one embodiment of the invention.

FIG. 5 is a block diagram illustrating an example of a data processing system 500 which may be used with one embodiment of the invention. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations and steps discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 500 may further include 10 devices such as devices 505-508, including network interface device(s) 505, optional input device(s) 506, and other optional IO device(s) 507. Network interface device 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). For example, input device 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-accessible storage medium 509 (also known as a machine-readable storage medium or a computer-readable medium) on which is stored one or more sets of instructions or software (e.g., processing module, unit, and/or logic 528) embodying any one or more of the methodologies or functions described herein. Processing module/unit/logic 528 may represent any of the components described above, such as, for example, a storage service logic, a deduplication engine, a FaaS module, or the data management system 101 as described above. Processing module/unit/logic 528 may also reside, completely or at least partially, within memory 503 and/or within processor 501 during execution thereof by data processing system 500, memory 503 and processor 501 also constituting machine-accessible storage media. Processing module/unit/logic 528 may further be transmitted or received over a network via network interface device 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of managing unstructured data, comprising:
   identifying, by a data management system, a plurality of unstructured data items in a plurality of data subjects;
   recognizing, by the data management system, a plurality of regions of interest (ROIs) in the plurality of unstructured data items;
   extracting, by the data management system, the plurality of ROIs from the plurality of unstructured data items;
   encoding, by the data management system, the plurality of extracted ROIs into a plurality of ROI vectors;
   creating, by the data management system, a data graph to represent the plurality of data subjects, the plurality of data items, and the plurality of ROI vectors; and storing, by the data management system, the data graph into a graph database.

2. The computer-implemented method of claim 1, further comprising:
grouping, by the data management system, the plurality of ROI vectors into a plurality of content clusters according to a predetermined algorithm.

3. The computer-implemented method of claim 2, wherein the predetermined algorithm is one of a K-means or Density-based spatial clustering of applications with noise (DBSCAN).

4. The computer-implemented method of claim 1, further comprising:
identifying, by the data management system, one or more structured data items in the plurality of data subjects;
converting, by the data management system, the one or more structured items into one or more feature vectors; and
storing, by the data management system, each of the one or more feature vectors as a ROI node as part of the data graph in the graph database, or as a row in a table in the graph database.

5. The computer-implemented method of claim 1, wherein the plurality of ROIs are recognized using a ruled-based algorithm or an attention-based neural network model.

6. The computer-implemented method of claim 5, wherein the plurality of ROIs are extracted from the plurality of unstructured data items using a plurality of content extractors.

7. The computer-implemented method of claim 1, further comprising:
retrieving, by one of a plurality of services, unstructured data items from the graph database.

8. A non-transitory machine-readable medium having instructions stored therein, which, when executed by a processor, cause the processor to perform operations of managing unstructured data, the operations comprising:
identifying, by a data management system, a plurality of unstructured data items in a plurality of data subjects;
recognizing, by the data management system, a plurality of regions of interest (ROIs) in the plurality of unstructured data items;
extracting, by the data management system, the plurality of ROIs from the plurality of unstructured data items;
encoding, by the data management system, the plurality of extracted ROIs into a plurality of ROI vectors;
creating, by the data management system, a data graph to represent the plurality of data subjects, the plurality of data items, and the plurality of ROI vectors; and
storing, by the data management system, the data graph into a graph database.

9. The non-transitory machine-readable medium of claim 8, the operations further comprising:
grouping, by the data management system, the plurality of ROI vectors into a plurality of content clusters according to a predetermined algorithm.

10. The non-transitory machine-readable medium of claim 9, wherein the predetermined algorithm is one of a K-means or Density-based spatial clustering of applications with noise (DBSCAN).

11. The non-transitory machine-readable medium of claim 8, the operations further comprising:
identifying, by the data management system, one or more structured data items in the plurality of data subjects;
converting, by the data management system, the one or more structured items into one or more feature vectors; and
storing, by the data management system, each of the one or more feature vectors as a ROI node as part of the data graph in the graph database, or as a row in a table in the graph database.

12. The non-transitory machine-readable medium of claim 8, wherein the plurality of ROIs are recognized using a ruled-based algorithm or an attention-based neural network model.

13. The non-transitory machine-readable medium of claim 12, wherein the plurality of ROIs are extracted from the plurality of unstructured data items using a plurality of content extractors.

14. The non-transitory machine-readable medium of claim 8, the operations further comprising:
retrieving, by one of a plurality of services, unstructured data items from the graph database.

15. A data processing system, comprising:
a processor; and
a memory coupled to the processor to store instructions, which when executed by the processor, cause the processor to perform operations of managing unstructured data, the operations comprising:
identifying a plurality of unstructured data items in a plurality of data subjects;
recognizing a plurality of regions of interest (ROIs) in the plurality of unstructured data items;
extracting the plurality of ROIs from the plurality of unstructured data items;
encoding the plurality of extracted ROIs into a plurality of ROI vectors;
creating a data graph to represent the plurality of data subjects, the plurality of data items, and the plurality of ROI vectors; and
storing the data graph into a graph database.

16. The data processing system of claim 15, the operations further comprising:
grouping the plurality of ROI vectors into a plurality of content clusters according to a predetermined algorithm.

17. The data processing system of claim 16, wherein the predetermined algorithm is one of a K-means or Density-based spatial clustering of applications with noise (DBSCAN).

18. The data processing system of claim 15, the operations further comprising:
identifying one or more structured data items in the plurality of data subjects;
converting the one or more structured items into one or more feature vectors; and
storing each of the one or more feature vectors as a ROI node as part of the data graph in the graph database, or as a row in a table in the graph database.

19. The data processing system of claim 15, wherein the plurality of ROIs are recognized using a ruled-based algorithm or an attention-based neural network model.

20. The data processing system of claim 19, wherein the plurality of ROIs are extracted from the plurality of unstructured data items using a plurality of content extractors.

* * * * *